US009644810B2

(12) United States Patent
Yamamoto

(10) Patent No.: US 9,644,810 B2
(45) Date of Patent: May 9, 2017

(54) LAMP UNIT

(71) Applicant: KOITO MANUFACTURING CO., LTD., Tokyo (JP)

(72) Inventor: Ippei Yamamoto, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 309 days.

(21) Appl. No.: 14/374,316

(22) PCT Filed: Jan. 22, 2013

(86) PCT No.: PCT/JP2013/051138
§ 371 (c)(1),
(2) Date: Jul. 24, 2014

(87) PCT Pub. No.: WO2013/111722
PCT Pub. Date: Aug. 1, 2013

(65) Prior Publication Data

US 2015/0009700 A1 Jan. 8, 2015

(30) Foreign Application Priority Data

Jan. 26, 2012 (JP) ................................ 2012-013934

(51) Int. Cl.
*B60Q 1/00* (2006.01)
*B60Q 3/00* (2006.01)
(Continued)

(52) U.S. Cl.
CPC ....... *F21S 48/1216* (2013.01); *F21S 48/1159* (2013.01); *F21S 48/1275* (2013.01);
(Continued)

(58) Field of Classification Search
CPC ............... F21S 48/1216; F21S 48/1159; F21S 48/1275; F21S 48/1388; F21S 48/1747;
(Continued)

(56) References Cited

U.S. PATENT DOCUMENTS

2003/0072167 A1* 4/2003 Albou .................. B60Q 1/0041 362/543
2007/0086202 A1* 4/2007 Tsukamoto .......... F21S 48/1159 362/514

(Continued)

FOREIGN PATENT DOCUMENTS

EP 2 187 115 A2 5/2010
JP 2003-151318 A 5/2003

(Continued)

OTHER PUBLICATIONS

International Search Report for corresponding International Application No. PCT/JP2013/051138, mailed Mar. 26, 2013 (3 pages).

(Continued)

*Primary Examiner* — Jason Moon Han
(74) *Attorney, Agent, or Firm* — Osha Liang LLP

(57) ABSTRACT

A lamp unit has a first light source, a second light source which is illuminated when the first light source is turned off, and a projection lens having a first entering surface which is associated with a first focal point and a second entering surface which is associated with a second focal point. Light emitted from the first light source is incident on the first entering surface and passes through the projection lens. The second light source is disposed between the first light source and the projection lens in a position through which light emitted from the first light source to reach the first entering surface does not pass. Light emitted from the second light source is incident on the second entering surface and passes through the projection lens.

10 Claims, 5 Drawing Sheets

(51) Int. Cl.
*F21S 8/10* (2006.01)
*F21W 101/10* (2006.01)

(52) U.S. Cl.
CPC ....... *F21S 48/1388* (2013.01); *F21S 48/1747* (2013.01); *F21W 2101/10* (2013.01)

(58) Field of Classification Search
CPC .... F21S 48/115; F21S 48/1154; F21S 48/125; F21W 2101/10
USPC .................................. 362/538–539, 543–545
See application file for complete search history.

(56) References Cited

U.S. PATENT DOCUMENTS

| | | | | |
|---|---|---|---|---|
| 2008/0112180 | A1* | 5/2008 | Okada .................. | F21S 48/1154 362/518 |
| 2010/0053987 | A1* | 3/2010 | Nakabayashi ....... | F21S 48/1154 362/538 |
| 2011/0205748 | A1* | 8/2011 | Yatsuda ............... | F21S 48/1159 362/517 |

FOREIGN PATENT DOCUMENTS

| | | | |
|---|---|---|---|
| JP | 2009-32494 | A | 2/2009 |
| JP | 2010-108727 | A | 5/2010 |
| JP | 2010-118241 | A | 5/2010 |
| JP | 2013-16327 | A | 1/2013 |

OTHER PUBLICATIONS

Written Opinion for corresponding International Application No. PCT/JP2013/051138, mailed Mar. 26, 2013 (4 pages).

* cited by examiner

LAMP UNIT

CROSS-REFERENCE TO RELATED APPLICATIONS

The present patent application is based on Japanese Patent Application No. 2012-013934 filed on Jan. 26, 2012, the contents of which are incorporated herein by reference.

TECHNICAL FIELD

The present invention relates to a lamp unit mounted in a vehicle lamp.

BACKGROUND ART

There is known a vehicle lamp which includes a plurality of light sources which are individually associated with different illuminating functions. For example, in a vehicle lamp described in Patent Document 1, at least one light source is provided so as to be associated with each of five illuminating functions to illuminate a low beam light source, a high beam light source, a daytime running lamp (DRL) light source, and a cornering lamp light source.

Light output from each light source is reflected by a reflector to be shone to a predetermined area. For example, as described in Patent Document 2, a lamp unit is known in which light output from a light source is collected by a reflector to be shone on to a predetermined area through a projection lens.

PRIOR ART DOCUMENT

Patent Document

Patent Document 1: JP-A-2009-32494
Patent Document 2: JP-A-2010-108727

SUMMARY OF THE INVENTION

Lamp units that are to be mounted in vehicle lamps are required to have multiple functions and be small in size and light in weight. As described in Patent Document 2, when projection lenses are provided for individual light sources which are associated with a plurality of illuminating functions, it is not possible to meet the demand for lamp units small in size and light in weight.

Consequently, one or more embodiments of the invention provide a lamp unit which can meet the demand for lamp units small in size and light in weight while including a plurality of light sources which can deal with a plurality of illuminating functions.

In one or more embodiments of the present invention, according to a first aspect of the invention, there is provided a lamp unit including:

a first light source;

a second light source which is illuminated when the first light source is turned off; and a projection lens having a first entering surface which is associated with a first focal point and a second entering surface which is associated with a second focal point, wherein light emitted from the first light source is incident on the first entering surface and passes through the projection lens, wherein the second light source is disposed between the first light source and the projection lens in a position through which light emitted from the first light source to reach the first entering surface does not pass, and wherein light emitted from the second light source is incident on the second entering surface and passes through the projection lens.

According to this configuration, the second light source which is associated with the different illuminating function can be disposed in an interior of the same lamp unit without interrupting the illuminating function that is originally provided with the first light source and the projection lens can be shared by the first and second light sources. Additionally, since the projection lens has two different focal points by including the first entering surface and the second entering surface, a different light distribution can be imparted to light incident on each of the planes of incidence. The second light source can form a desired light distribution pattern by making use of the second entering surface while sharing the projection lens with the first light source.

A configuration may be adopted in which part of light emitted from the second light source is incident on the first entering surface and passes through the projection lens. As this occurs, the area of the light distribution pattern formed by the second light source can be increased.

A configuration may be adopted in which at least part of light emitted from the second light source is reflected by at least one reflection plane and passes through the projection lens. As this occurs, an optical path of light which is emitted to reach the projection lens can be set as required, increasing the degree of freedom in disposing the second light source and the second entering surface.

For example, a configuration can be adopted in which the first light source is a headlamp light source and the second light source is a daytime running lamp light source.

In one or more embodiments of the present invention, according to a second aspect of the invention, there is provided a lamp unit including:

A first light source which emits light having a first luminous intensity;

A second light source having a second luminous intensity which is lower than the first luminance intensity; and A projection lens having a first entering surface which is associated with a first focal point and a second entering surface which is associated with a second focal point, wherein Light emitted from the first light source is incident on the first entering surface and passes through the projection lens, wherein the second light source is disposed between the first light source and the projection lens in a position through which light emitted from the first light source to reach the first entering surface does not pass, and wherein light emitted from the second light source is incident on the first entering surface and the second entering surface and passes through the projection lens.

The same function as that obtained by the first aspect can also be obtained by this configuration.

According to one or more embodiments of the invention, it is possible to the lamp unit which can meet the demand for lamp units small in size and light in weight while including the plurality of light sources which can deal with the plurality of illuminating functions.

DESCRIPTION OF EMBODIMENTS

Figure 1:
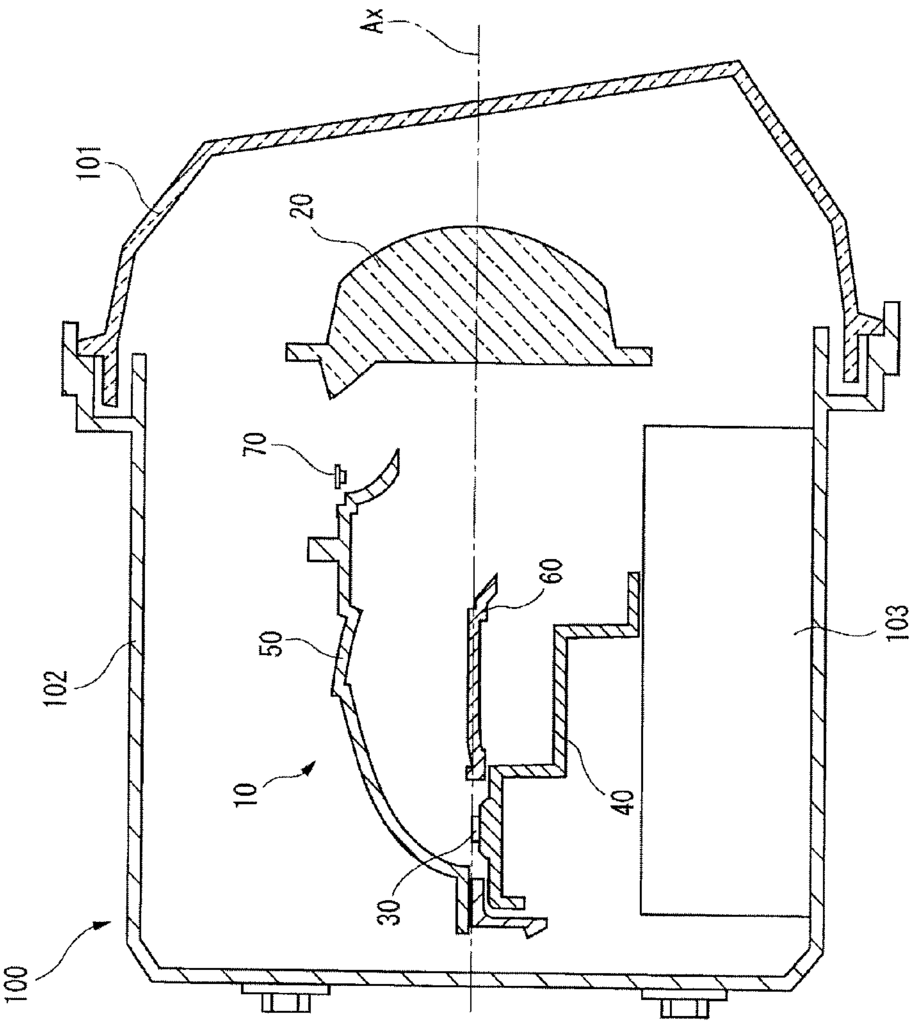
FIG. 1 is a vertical sectional view which shows schematically the configuration of a headlamp which includes a lamp unit according to an embodiment of the invention.

Embodiments of the invention will be described in detail below by reference to the accompanying drawings. In the drawings used for the following description, scales are changed as required so as to show constituent members in such sizes that they can be recognized.

FIG. 1 shows a configuration resulting from cutting part of a headlamp 100 which is an example of a vehicle lamp which includes a lamp unit 10 according to an embodiment of the invention along a vertical plane and being viewed from the right-hand side thereof. The headlamp 100 includes a transparent cover 101, a lamp body 102 and a base member 103.

The transparent cover 101 is formed from a resin having a light transmitting property and is attached to a front end of the lamp body 102 to define a lamp compartment where the lamp unit 10 is accommodated. The lamp unit 10 is fixed to an upper side of the base member 103 and includes a projection lens 20, a first light emitting element 30, a holder 40, a reflector 50, a shade 60 and a second light emitting element 70.

Figure 2:
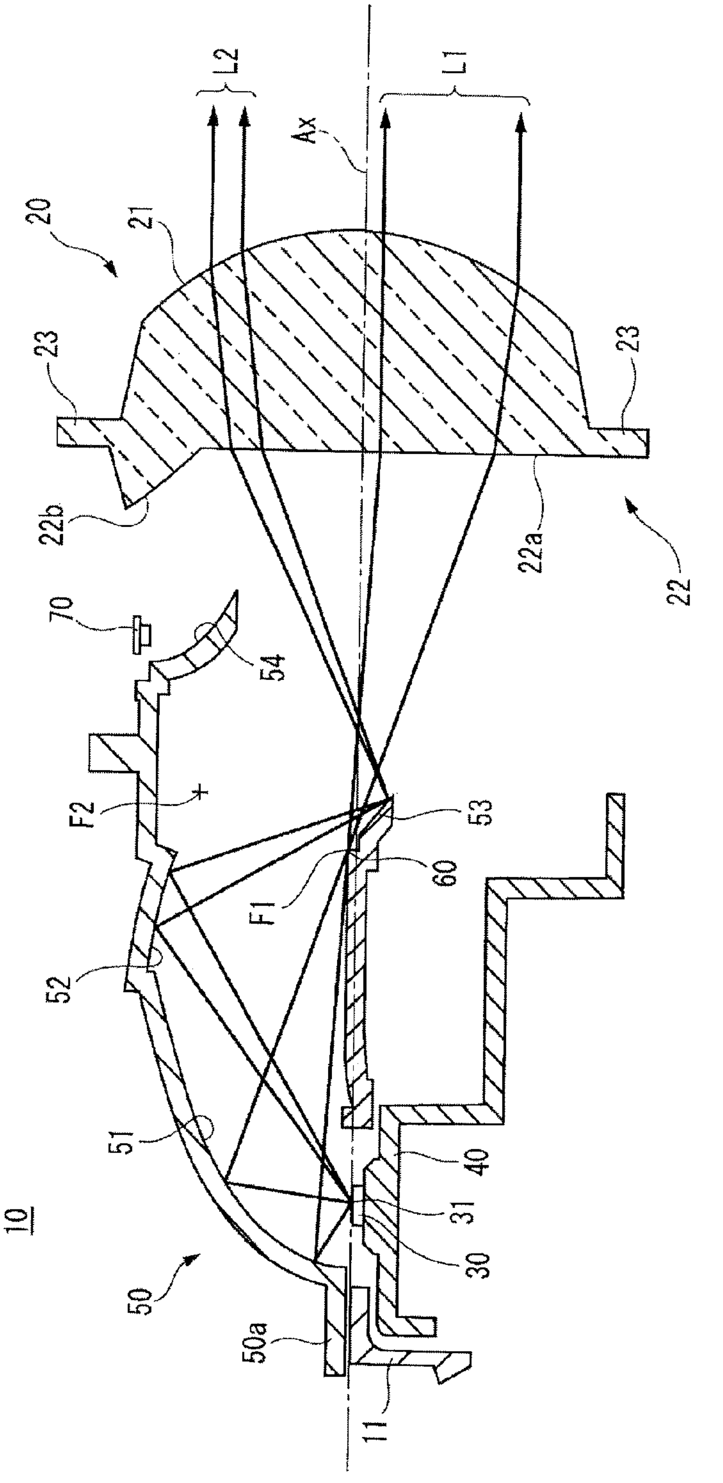
FIG. 2 is a vertical sectional view showing a state in which a first light emitting element is illuminated in the lamp unit shown in FIG. 1.

As shown in FIG. 2, the projection lens 20 is disposed on an optical axis Ax which extends in a front-to-rear direction of a vehicle. The projection lens 20 is a planoconvex aspheric lens in which a front side (an outer side of the vehicle) is formed into a convex exiting surface 21 and a rear side (an inner side of the vehicle) is formed into a flat entering surface 22. A circumferential edge portion 23 of the projection lens 20 is supported on the holder 40 via a support member, not shown.

The entering surface 22 has a first entering surface 22*a* which is disposed so as to be at right angles to the optical axis Ax and a second entering surface 22*b* which is disposed so as to be inclined with respect to the optical axis Ax. The second entering surface 22*b* is formed as a result of an upper part of the projection lens 20 being caused to project to the rear.

The projection lens 20 is configured to have two rear focal points F1, F2 by including the second entering surface 22*b*. The first entering surface 22*a* is a entering surface which is associated with the first rear focal point F1 which is an example of a first focal point, and the second entering surface 22*b* is a entering surface which is associated with the second rear focal point F2 which is an example of a second focal point. The second rear focal point F2 is positioned forwards and upwards of the first rear focal point F1.

The first light emitting element 30, which is an example of a first light source, is a white light emitting diode which is used as a light source to output a low beam which illuminates a near foreground of the vehicle. The first light emitting element 30 is disposed further rearwards than the first rear focal point F1 of the projection lens 20 and is supported on the holder 40 with its light emitting plane oriented vertically upwards. The holder 40 is made of a metallic material having a high thermal conductivity and is fixed to the base member 103 (refer to FIG. 1).

The reflector 50 has a first reflection plane 51 having a dome shape which covers the first light emitting element 30 from thereabove. A rear end portion 50*a* of the reflector 50 is fixed to the holder 40 via a support member 11.

The first reflection plane 51 is shaped so as to reflect light emitted from the first light emitting element 30 towards the projection lens 20 while approaching the optical axis Ax. Specifically, a section of the first reflection plane 51 along a horizontal plane which includes the optical axis Ax is formed into an elliptic shape which takes a light emitting center 31 of the first light emitting element 30 as a first focal point and the first rear focal point F1 of the projection lens 20 as a second focal point.

The first reflection plane 51 which is shaped as described above converges light emitted from the first light emitting element 30 to the first rear focal point F1 of the projection lens 20. Light which has passed through the first rear focal point F1 is incident on the first entering surface 22*a* and passes through the exiting surface 21 of the projection lens 20 as light L1.

Figure 4A:
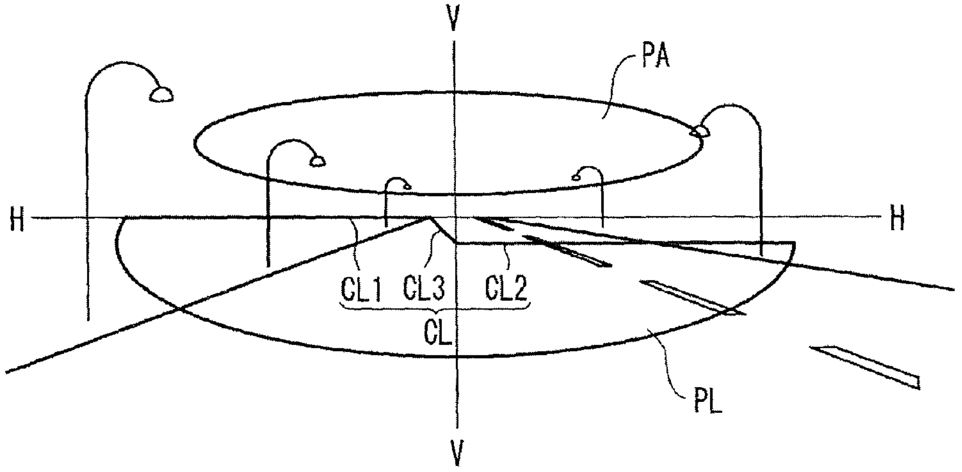
FIG. 4A and FIG. 4B show drawings which show schematically light distribution patterns which are formed by the lamp unit shown in FIG. 1.

A low beam pattern denoted by reference character PL in FIG. 4A is formed on an imaginary vertical screen which is disposed in front of the vehicle by the light L1. The low beam pattern PL is a leftward light distribution pattern (which is used in regions where it is mandatory that vehicles are driven on the left) and has a first cut-off line CL1, a second cut-off line CL2 and a third cut-off line CL3 at an upper edge thereof.

The first cut-off line CL1 which is used as a cut-off line for a subject vehicle's lane and a second cut-off line CL2 which is used as a cut-off line for an oncoming vehicle's lane extend along the direction of a horizontal line H-H while they are vertically staggered at a vertical line V-V as a boundary. The third cut-off line CL3 extends obliquely downwards to the right from a right end portion of the first cut-off line CL1 to connect to a left end portion of the second cut-off line CL2. In the following description, the first to third cut-off lines CL1 to CL3 will be referred to generally as a "cut-off line CL" as required.

The cut-off line CL is formed as a reverted projected image of an upper edge shape of the shade 60 as a result of part of light which is reflected by the first reflection plane 51 of the reflector 50 being cut off by the shade 60. The shade 60 is disposed near the first rear focal point F1 of the projection lens 20.

The reflector 50 includes a second reflection plane 52 in front of the first reflection plane 51. Additionally, a third reflection plane 53 is formed in front of the shade 60. Part of light emitted from the first light emitting element 30 is reflected downwards by the second reflection plane 52 and is further reflected upwards by the third reflection plane 53. The light reflected by the third reflection plane is incident on the first entering surface 22*a* and passes through the exiting surface 21 of the projection lens 20 as light L2.

An additional beam pattern which is denoted by reference numeral PA in FIG. 4A is formed on the imaginary vertical screen disposed in front of the vehicle by the light L2. The additional beam pattern PA is a light distribution pattern to enhance the forward visibility by illuminating areas which do not dazzle the drivers of a preceding vehicle and an oncoming vehicle.

The lamp unit 10 of this embodiment includes further a second light emitting element 70 as an example of a second light source. The reflector 50 includes a fourth reflection plane 54 in front of the second reflection plane 52. The second light emitting element 70 and the fourth reflection plane 54 are disposed between the first light emitting element 30 and the projection lens 20 in a position through which light emitted from the first light emitting element 30 to reach the first entering surface 22*a* of the projection lens 20 does not pass.

The second light emitting element 70 is a white light emitting diode which is used as a light source for a daytime running lamp (DRL) and is illuminated at least when the first light emitting element 30 is turned off. The luminous intensity of light emitted from the second light emitting element 70 is lower than the luminous intensity of light emitted from the first light emitting element 30. The second light emitting element 70 is supported on a holder, not shown, with its light emitting plane oriented vertically downwards.

Figure 3:
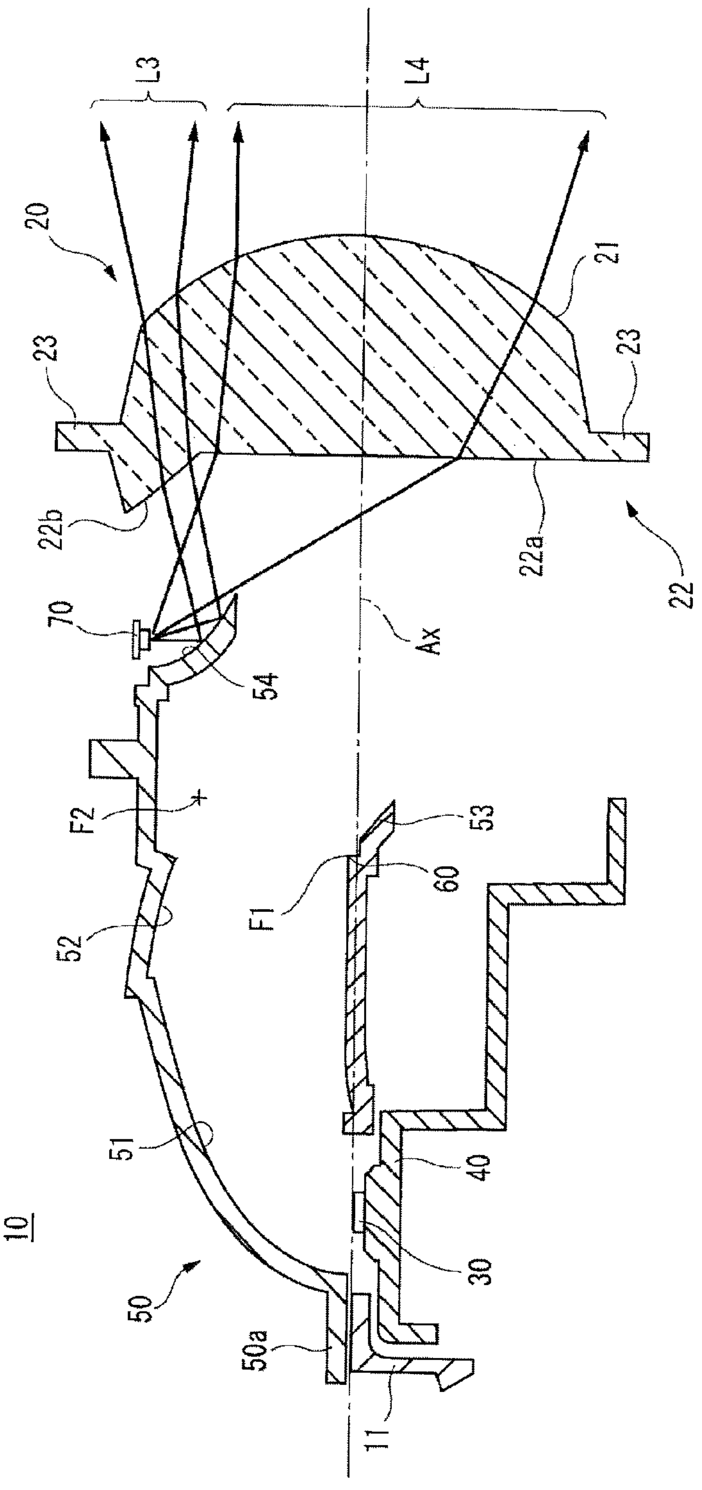
FIG. 3 is a vertical sectional view showing a state in which a second light emitting element is illuminated in the lamp unit shown in FIG. 1.

The fourth reflection plane 54 covers the second light emitting element 70 from therebelow and is shaped so as to reflect light emitted from the second light emitting element 70 towards the second entering surface 22*b* of the projection lens 20, as shown in FIG. 3. Light reflected by the fourth reflection plane 54 is incident on the second entering surface 22*b* and passes through the exiting surface 21 of the projection lens 20 as light L3.

Part of light emitted from the second light emitting element 70 is incident directly on the first entering surface 22*a* of the projection lens 20 without being reflected by the fourth reflection plane 54 and passes through the exiting surface 21 as light L4.

Figure 4B:
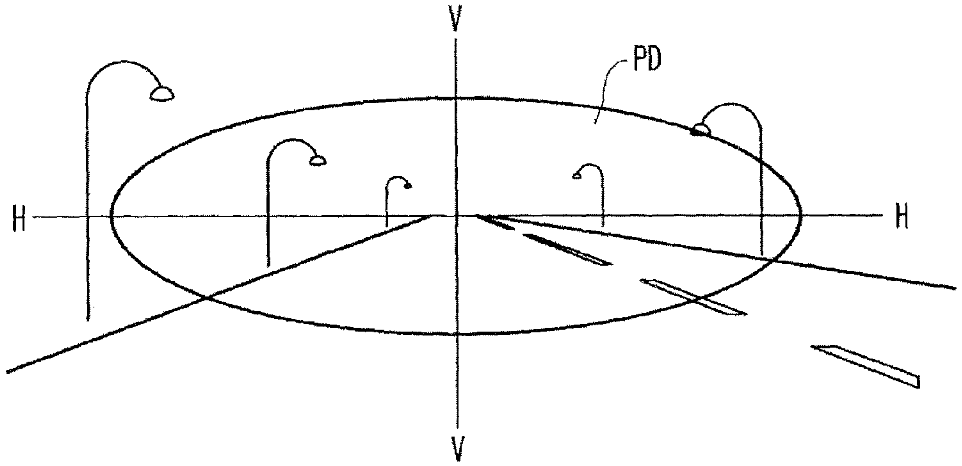

A DRL pattern denoted by reference character PD in FIG. 4B is formed on the imaginary screen which is disposed in front of the vehicle by the light L3 and the light L4. The DRL pattern PD is a light distribution pattern to illuminate uniformly the front of the vehicle about a point of intersection of the vertical line V-V with the horizontal line H-H.

In this embodiment, the second entering surface 22*b* of the projection lens 20 is formed in a position on which light emitted from the first light emitting element 30 is not incident or a position on which a relatively small quantity of light emitted from the first light emitting element 30 is incident. Then, the second light emitting element 70 and the fourth reflection plane 54 are disposed in the position through which light emitted from the first light emitting element 30 to reach the projection lens 20 does not pass. Consequently, the second light emitting element 70 which is associated with the DRL function can be disposed in an interior of the lamp unit 10 without interrupting the low beam shining function which is the original function of the first light emitting element 30.

When using, for example, a single focal-point projection lens which has only a rear focal point F1, in order to obtain the DRL pattern PD shown in FIG. 4B, a light source therefor needs to be disposed on the optical axis Ax. However, in the event that a projection lens is shared with a light source for low beam, the light source for the daytime running lamp which is so disposed cuts off light emitted from the light source for low beam.

Since the projection lens 20 of this embodiment has the two different focal points by including the first entering surface 22*a* and the second entering surface 22*b*, light incident on each entering surface can be given a different light distribution. In this embodiment, although the second light emitting element 70 is not disposed on the optical axis Ax, as shown in FIG. 4B, the DRL pattern PD can be located in the desired position by making use of the second entering surface 22*b*.

As a result, although the first light emitting element 30 for low beam and the second light emitting element 70 for daytime illumination are provided within the same lamp unit, the projection lens 20 can be shared between them without interrupting the illumination functions of both the light emitting elements. The second light emitting element 70 is disposed between the first light emitting element 30 and the projection lens 20, and an equal number of projection lenses to the number of light sources do not have to be provided. Therefore, the configuration can contribute to reduce the size and weight of the multi-functional lamp.

The embodiments described above are intended for easy understanding of the invention and is not intended to limit the same. It is obvious that the invention can be modified or improved without departing from the spirit and scope of the invention and the resultant equivalents are to be incorporated in the invention.

The first light emitting element 30 and the second light emitting element 70, which are the first light source and the second light source, are not limited to the white light emitting diodes. A configuration may be adopted in which a laser diode is used as a light emitting element or a lamp light source or the like is used in place of the light emitting element.

The application of the first light emitting element 30 is not limited to illumination of a low beam and hence may be used as a light source for illumination of a high beam which illuminates a wide and long range in front of the vehicle with a relatively high illuminance. Additionally, the first light emitting element 30 may also be used as a light source for low beam which doubles as a light source for high beam or vice versa. As this occurs, a low beam pattern and a high beam pattern can be switched therebetween by making the shade 60 movable. Namely, the first light emitting element 30, which is the example of the first light source, can be used as alight source for a headlamp.

In the event that the second light emitting element 70 is the light source which is illuminated when the first light emitting element 30 is turned off, the first light emitting element 30 and the second light emitting element 70 can be combined together as required to realize any combination selected from a headlamp light source, a tail lamp light source, a daytime running lamp light source, a direction indicator lamp light source, a side lamp light source and a cornering lamp light source.

Here, the description reading, "the second light emitting element 70 is illuminated when the first light emitting element 30 is turned off" denotes a state in which the light emitting elements are used to exhibit their original functions as the light sources. This does not prohibit the use of, for example, the second light emitting element 70 which is used as the daytime running lamp light source in the embodiment described above as a light source which is illuminated for decoration while the first light emitting element 30 is illuminated.

The fourth reflection plane 54 does not necessarily have to be provided. As long as the light distribution pattern according to the predetermined application can be formed, a configuration may be adopted in which only direct light from the second light emitting element 70 is allowed to be incident on the entering surface 22 of the projection lens 20.

Light emitted from the second light emitting element 70 does not necessarily have to be incident on both the first entering surface 22*a* and the second entering surface 22*b* of the projection lens 20. As long as the light distribution pattern according to the predetermined application can be formed, a configuration may be adopted in which light emitted from the second light emitting element 70 is incident only on the second entering surface 22*b*. In the case of the configuration in which light emitted from the second light emitting element 70 is incident also on the first entering surface 22*a*, the area of the light distribution pattern can be increased.

Figure 5:
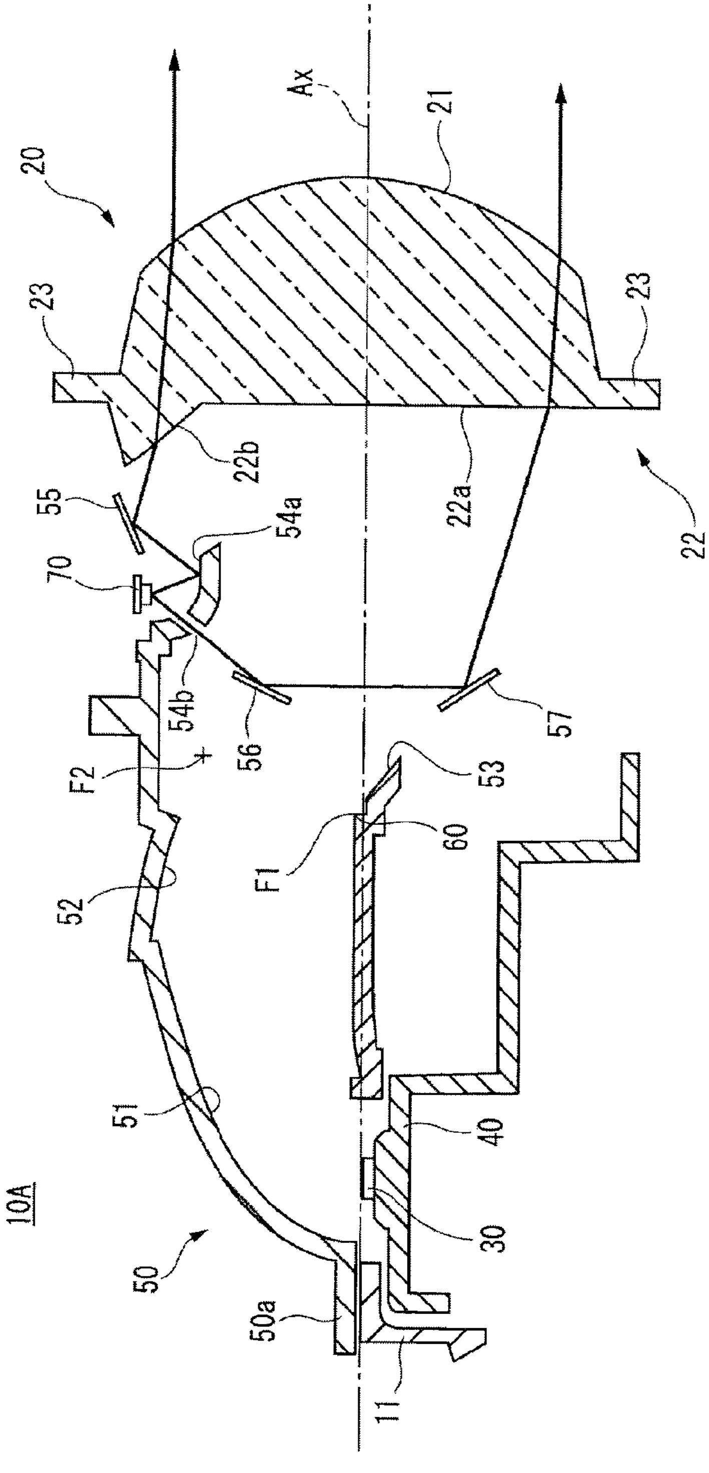
FIG. 5 is a vertical sectional view showing schematically a modified example made to the lamp unit shown in FIG. 1.

A configuration may be adopted in which light emitted from the second light emitting element 70 is reflected by at least one additional reflection plane in addition to the fourth reflection plane 54 to pass through the projection lens 20. For example, in the case of a lamp unit 10A according to a modified example shown in FIG. 5, light emitted from a second light emitting element 70 and reflected by a fourth reflection plane 54*a* is reflected by a fifth reflection plane 55 and is then incident on a second entering surface 22*b* of a projection lens 20. According to this configuration, in a case where the disposition of the second light emitting element 70 and the fourth reflection plane 54*a* is restricted so as not to interrupt light emitted from a first light emitting element 30, it is possible to increase the degree of freedom in setting an optical path for light emitted from the second light emitting element 70 to obtain a desired light distribution pattern.

Additionally, in the lamp unit 10A, an opening 54*b* is formed in part of the fourth reflection plane 54*a*, whereby part of light emitted from the second light emitting element 70 is allowed to pass through the opening 54*b*. The light that has passed through the opening 54*b* is reflected by a sixth reflection plane 56 and a seventh reflection plane 57 and is then guided to a lower portion on a first entering surface 22*a* of a projection lens 20. According to this configuration, it is possible to increase the degree of freedom in setting an optical path for light emitted from the second light emitting element 70 to form a light distribution pattern having a large area.

The position of the second entering surface 22*b* is not limited to the upper end portion of the projection lens 20. The second entering surface 22*b* can be formed in any appropriate position as long as the position is the position on which no light emitted from the first light emitting element 30 is incident or the position where a relative small amount of light emitted from the first light emitting element 30 is incident. As long as the second light emitting element 70 is disposed in the position through which light emitted from the first light emitting element 30 to reach the projection lens 20 does not pass, it is possible to set the optical path along which light emitted from the second light emitting element 70 is incident on at least the second entering surface 22*b* of the projection lens 20 by the method described above.

On the other hand, as long as the condition is satisfied that the luminous intensity of light emitted from the second light emitting element 70 is lower than the luminous intensity of light emitted from the first light emitting element 30 and that light emitted from the second light emitting element 70 is incident on the first entering surface 22*a* and the second entering surface 22*b* of the projection lens 20, the first light emitting element 30 and the second light emitting element 70 can be combined together as required to realize any combination selected from a headlamp light source, a tail lamp light source, a daytime running lamp light source, a direction indicator lamp light source, a side lamp light source and a cornering lamp light source. Namely, in this case, the second light emitting element 70 does not have to be such as to be illuminated when the first light emitting element 30 is turned off.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A lamp unit comprising:
a first light source;
a second light source which is illuminated when the first light source is turned off; and
a projection lens comprising:
a first entering surface which is associated with a first focal point, and
a second entering surface that is inclined with respect to the first entering surface, and that is associated with a second focal point,
wherein light emitted from the first light source is incident on the first entering surface and passes through the projection lens,
wherein the second light source is disposed between the first light source and the projection lens in a position through which light emitted from the first light source to reach the first entering surface does not pass, and
wherein light emitted from the second light source is incident on the second entering surface and passes through the projection lens.

2. The lamp unit according to claim 1,
wherein part of light emitted from the second light source is incident on the first entering surface and passes through the projection lens.

3. The lamp unit according to claim 1,
wherein at least part of light emitted from the second light source is reflected by at least one reflection plane and passes through the projection lens.

4. The lamp unit according to claim 1,
wherein the first light source is a headlamp light source and the second light source is a daytime running lamp light source.

5. The lamp unit according to claim 2,
wherein at least part of light emitted from the second light source is reflected by at least one reflection plane and passes through the projection lens.

6. The lamp unit according to claim 2,
wherein the first light source is a headlamp light source and the second light source is a daytime running lamp light source.

7. The lamp unit according to claim 3,
wherein the first light source is a headlamp light source and the second light source is a daytime running lamp light source.

8. The lamp unit according to claim 5,
wherein the first light source is a headlamp light source and the second light source is a daytime running lamp light source.

9. A lamp unit comprising:
a first light source;
a second light source which is illuminated when the first light source is turned off; and
a projection lens having a first entering surface which is associated with a first focal point and a second entering surface which is associated with a second focal point,
wherein light emitted from the first light source is incident on the first entering surface and passes through the projection lens,
wherein the second light source is disposed between the first light source and the projection tens in a position where none of the tight emitted from the first light source is directed to before reaching the first entering surface, and wherein light emitted from the second light source is incident on the second entering surface and passes through the projection lens.

10. A lamp unit comprising:

a first light source;

a second light source which is illuminated when the first light source is turned off; and a projection tens having a first entering surface which is associated with a first focal point, and a second entering surface which is associated with a second focal point, wherein light emitted from the first light source is incident on the first entering surface and passes through the projection lens, wherein the second light source is disposed between the first light source and the projection lens in a position through which light emitted from the first light source to reach the first entering surface does not pass, wherein light emitted from the second light source is incident on the second entering surface and passes through the projection lens, and wherein the second light source is disposed in a same horizontal plane as the second entering surface.

* * * * *